Dec. 17, 1957  C. K. BANKS  2,816,852
FLOOR COVERING
Filed July 14, 1954

INVENTOR.
Clarence Kenneth Banks

BY Moses, Nolte, Crewo+Berry
ATTORNEYS

United States Patent Office 2,816,852
Patented Dec. 17, 1957

2,816,852

FLOOR COVERING

Clarence Kenneth Banks, Westfield, N. J., assignor to Metal & Thermit Corporation, New York, N. Y., a corporation of New Jersey Application July 14, 1954, Serial No. 443,257

4 Claims. (Cl. 154—49)

This invention relates to a long-lasting and resilient floor covering.

Although vinyl chloride polymers have been used in the manufacture of floor covering tiles and sheets, certain disadvantages have rendered its use undesirable. The good surface and wearing qualities of vinyl chloride polymers are sacrificed when said formulation is admixed with other materials necessary in the manufacture of a suitable floor covering. Furthermore, vinyl chloride polymers are expensive and when made less expensive by the addition of limestone and/or asbestos, the formulation becomes brittle and loses other desirable properties. Still another disadvantage of the vinyl chloride polymers is their lack of resiliency, which is a desirable feature of a floor covering. Accordingly, the advantages of the vinyl chloride polymers have been utilized and the disadvantages thereof avoided by the development of the present floor covering.

In accordance with the present invention, the floor covering includes a smooth dense vinyl upper surface and a substrate of vinyl sponge. The upper smooth hard vinyl surface provides the long wearing qualities and the vinyl sponge substrate provides the resiliency to the floor covering, thereby resulting in a superior floor covering. Any vinyl chloride polymer formulation capable of producing a hard but not brittle plastic, including some unplasticized, or rigid, formulations, may be utilized for the upper dense wearing surface. Similarly, any typical vinyl sponge formulation may be used for the substrate. More specifically, the vinyl plastic formulation, utilized in the manufacture of the present floor covering contains a vinyl chloride polymer as the major ingredient, plus various plasticizers, stabilizers, coloring materials, fillers and loading agents. The particular formulation utilized is dependent on the degree of flexibility desired, the particular pattern or design, the weight of the finished product, and other similar considerations.

The long-lasting, resilient floor covering including a smooth hard vinyl upper surface and a vinyl sponge substrate may be prepared by expanding the vinyl sponge composition against a smooth or patterned hot plate whereby the surface in contact with the plate becomes compacted. Another method of preparing the present floor coverings comprises heat sealing a smooth hard vinyl sheet to a thicker sheet of vinyl sponge. Still another method comprises the application of a sponge formulation to a preformed hard smooth vinyl sheet, and heating them between heated press platens. In the latter two methods, the two layers of the floor covering are independently formed and laminated; whereas in the first mentioned method the two layers are formed and laminated simultaneously. Various designs or patterns and colors may be incorporated in the dense upper layer or between the layers or in the vinyl plastic formulation which is expanded when in contact with the hot plate.

Figure 1:
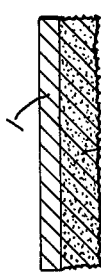
Figs. 1 and 2 are vertical cross-sections of the present floor covering.
Figure 2:

Figures 1 and 2 show the structure of the vinyl floor covering of the present invention, which consists of a hard, smooth vinyl upper surface 1 and a vinyl sponge lower layer 2. The line of demarcation between the two layers is more clearly defined as shown in Fig. 2 when the two layers are independently formed and laminated. Fig. 1 illustrates a less definite line of demarcation between the two layers when both are formed and laminated simultaneously.

The temperature employed in the hydraulic press or similar equipment is elevated above the softening point of the vinyl plastic formulation in order to enable said composition to flow onto the heated plates of the press. Under these conditions the gas forming reactions in the sponge formulation take place and the porous underlayer is formed. The preferred temperature of the heated platens is in the range 325–335° F.

The length of time of subjecting said plastic formulation to the heated plates in the press is the time necessary for formation of the sponge, and for the plastic materials to flow enough to properly follow the smooth or patterned surface of the platens. This is usually accomplished after a period of about ten minutes.

The amount of pressure applied to the platsic formulaiton situated between the two plates is not critical, and need not be high. It should be sufficient to keep the plastic mass always in contact with both platens. In this way there is formed a two layer floor covering including an upper smooth hard durable layer and a soft spongy backing layer, the suggested thickness of said floor covering being about ⅛ inch.

The following examples are further illustrative of the present invention, and it will be understood that the invention is not limited thereto:

EXAMPLE I

*Vinyl sponge floor tile*

The following formulation was prepared by grinding the ingredients together in a mortar.

|  | Parts by weight |
|---|---|
| Geon 121 (a homopolymer polyvinyl chloride resin of plastisol grade) | 100 |
| Paraplex G–53 (a polymeric plasticizer) | 20 |
| Di-2-ethyl hexyl phthalate | 60 |
| Chlorowax 40 (a chlorinated paraffin having 40% chlorine) | 60 |
| Water ground calcium carbonate | 40 |
| Blowing agent—Celogen (p, p′, oxy (bis-benzene sulfonyl hydraside) a product of Nangatuck Chemical) | 5 |
| Stabilizer | 1 |
| Ultramarine blue-dye | 2 |

The platens of an hydraulic press were heated to about 325–335° F. The formulation above, which was a soft blue paste, was poured on the platens, spread out and pressed to a thickness of about ⅛". After 10 minutes the product was removed from the press as a spongy mat having fine air pockets, with a relatively smooth and hard surface.

The addition of more filler and blowing agent results in a floor covering possessing even more favorable wearing and resiliency properties.

EXAMPLE II

A thin plastic sheet is made by milling the following ingredients together:

| | Parts by weight |
|---|---|
| Polyvinyl chloride resin | 30 |
| Di-2-ethyl hexyl phthalate | 13 |
| Calcium carbonate | 35 |
| Asbestos | 20 |
| Titanium dioxide | 1 |
| Stabilizer | 1 |

Color, as desired.

A piece of such sheeting was fitted into a hot, recessed platen. On it was placed a portion of the following sponge formulation:

| | Parts by weight |
|---|---|
| Geon 121 | 100 |
| Paraplex G-53 | 20 |
| Di-2-ethyl hexyl phthalate | 40 |
| Chlorowax 40 | 70 |
| Water ground calcium carbonate | 75 |
| Blowing agent | 5 |
| Stabilizer | 1 |

The combination was pressed to about 1/8" thickness and held between the two platens for about 10 minutes. There was produced a tile with a hard smooth surface backed by a soft sponge layer.

EXAMPLE III

Vinyl floor tile with sponge backing

A rigid polyvinyl chloride plastic sheet is made by milling together the following ingredients:

| | Parts |
|---|---|
| Polyvinyl chloride resin | 100 |
| Titanium dioxide | 5 |
| Stabilizer | 2–3 |
| Stearic acid | 1/4 |

A sheet of any desired thickness is then removed from the mill. A section of this sheet is cut out and put into a hot recessed platen. The sponging formulation of Example II is poured in. This is covered over and heated in the press. A tile is recovered having a hard vinyl tile surface with a soft sponge like backing.

The quantities of the two ingredients can be controlled so that the finished tile recovered has an overall thickness of 1/8", and an approximate weight of 15 oz. per square foot. This presents a favorable floor tile using economic quantities of ingredients, and having light weight, smoothness, durability and resiliency.

Figure 3:
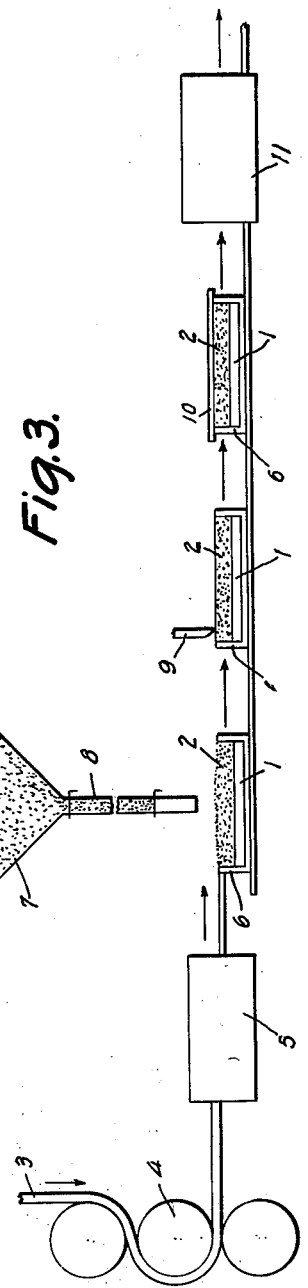
Fig. 3 is a schematic view showing an apparatus for making the floor covering of the present invention.

The method of Ex. III can be made into a continuous process, as shown by Fig. 3, wherein the surface tile 3, is sent through a mill 4, onto a cutting machine 5. A section of the milled surface tile is cut and placed into a recessed platen 6. Sponging material from receptacle 7 is metered through line 8, onto the recessed platen 6 containing the cut section of the surface tile. A doctor blade 9 levels off the amount of sponging material delivered onto the surface tile and fills the recess evenly. Since sponging material tends to cause curling of the finished tile, judicious use of this material is necessary. A cover 10 is put on the recessed platen thereby sealing the material in the recess. The sealed recessed platen containing the surface tile and sponging material is passed through an oven 11 for curing wherein the surface tile is polished at the same time that the sponge is blown. This results in the formation of the improved floor covering of the present invention which consists of a smooth dense upper vinyl layer and a vinyl sponge lower layer intimately bound together as shown by Fig. 2.

I have described what I believe to be the best embodiments of my invention. I do not wish, however, to be confined to the embodiments shown, but what I desire to cover by Letters Patent is set forth in the appended claims.

What is claimed by Letters Patent is:

1. A long wearing, resilient, two layer homopolymer polyvinyl chloride resin composition floor tile being substantially rectangular in shape and about 1/8" in thickness, and consisting essentially of an upper section and a lower substrate which lie substantially parallel to each other, said upper section comprising a substantially homogeneous, smooth, dense, hard, wear resistant layer of homopolymer polyvinyl chloride resin composition, and said lower substrate comprising a substantially homogeneous, resilient sponge layer of homopolymer polyvinyl chloride resin composition, said upper section being formed from a composition comprising homopolymer polyvinyl chloride, coloring agent and stabilizer, wherein said homopolymer polyvinyl chloride comprises the major constituent and not more than 100 parts by weight of said upper section, and wherein said coloring agent and stabilizer constitute minor constituents of said upper section, and not more than 5 parts by weight and 3 parts by weight, respectively, of said upper section, said lower substrate being formed from a homopolymer polyvinyl chloride resin composition comprising homopolymer polyvinyl chloride as the major constituent, which constitutes no more than 100 parts by weight of said lower substrate, and as minor constituents, a stabilizer, polymeric plasticizer, di-2-ethyl hexyl phthalate, chlorowax, calcium carbonate and blowing agent, said minor constituents being present in nor more than the following quantities:

| | Parts by weight |
|---|---|
| Stabilizer | 1 |
| Polymeric plasticizer | 20 |
| Di-2-ethyl hexyl phthalate | 60 |
| Chlorowax | 70 |
| Calcium carbonate | 75 |
| Blowing agent | 5 |

2. A long wearing, resilient, two layer homopolymer polyvinyl chloride resin composition floor tile being substantially rectangular in shape and about 1/8" in thickness, and consisting essentially of an upper section and a lower substrate which lie substantially parallel to each other, said upper section comprising a substantially homogeneous, smooth, dense, hard, wear resistant layer of homopolymer polyvinyl chloride resin composition, and said lower substrate comprising a substantially homogeneous, resilient sponge layer of polyvinyl chloride resin composition, said tile being formed of a homopolymer polyvinyl chloride resin composition comprising the following composition:

| | Parts by weight |
|---|---|
| Homopolymer polyvinyl chloride | 100 |
| Polymeric plasticizer | 20 |
| Di-2-ethyl hexyl phthalate | 60 |
| Chlorowax | 60 |
| Water ground calcium carbonate | 40 |
| p,p', Oxy(bis-benzene sulfonyl hydraside) | 5 |
| Stabilizer | 1 |
| Coloring agent | 2 |

3. A long wearing, resilient, two layer homopolymer polyvinyl chloride resin composition floor tile being substantially rectangular in shape and about 1/8" in thickness, and consisting essentially of an upper section and a lower substrate which lie substantially parallel to each other, said upper section comprising a substantially homogeneous, smooth, dense, hard, wear resistant layer of homopolymer polyvinyl chloride resin composition, and said lower substrate comprising a substantially homogeneous resilient sponge layer of polyvinyl chloride resin composition, said upper section being formed of a homopolymer polyvinyl chloride resin composition comprising the following composition:

| | Parts by weight |
|---|---|
| Homopolymer polyvinyl chloride | 30 |
| Di-2-ethyl hexyl phthalate | 13 |
| Calcium carbonate | 35 |
| Asbestos | 20 |
| Titanium dioxide | 1 |
| Stabilizer | 1 | said lower substrate being formed of a homopolymer polyvinyl chloride resin composition comprising the following composition:

| | Parts by weight |
|---|---|
| Homopolymer of polyvinyl chloride | 100 |
| Polymeric plasticizer | 20 |
| Di-2-ethyl hexyl phthalate | 40 |
| Chlorowax | 70 |
| Water ground calcium carbonate | 75 |
| $p,p'$, Oxy(bis-benzene sulfonyl hydraside) | 5 |
| Stabilizer | 1 |

4. A long wearing resilient, two layer homopolymer polyvinyl chloride resin composition floor tile being substantially rectangular in shape and about 1/8" in thickness, and consisting essentially of an upper section and a lower substrate which lie substantially parallel to each other, said upper section comprising a substantially homogeneous, smooth, dense, hard, wear resistant layer of homopolymer polyvinyl chloride resin composition, and said lower substrate comprising a substantially homogeneous resilient sponge layer of polyvinyl chloride resin composition, said upper section being formed of a homopolymer polyvinyl chloride resin composition comprising the following composition:

| | Parts by weight |
|---|---|
| Homopolymer polyvinyl chloride | 100 |
| Titanium dioxide | 5 |
| Stabilizer | 2–3 |
| Stearic acid | 1/4 | and said lower substrate being formed of a homopolymer polyvinyl chloride resin composition comprising the following composition:

| | Parts by weight |
|---|---|
| Homopolymer polyvinyl chloride | 100 |
| Polymeric plasticizer | 20 |
| Di-2-ethyl hexyl phthalate | 40 |
| Chlorowax | 70 |
| Water ground calcium carbonate | 75 |
| $p,p'$, Oxy(bis-benzene sulfonyl hydraside) | 5 |
| Stabilizer | 1 |

References Cited in the file of this patent

UNITED STATES PATENTS

| | | |
|---|---|---|
| 842,356 | Stone | Jan. 29, 1907 |
| 1,584,694 | Miller | May 11, 1926 |
| 1,614,853 | Schwartz | Jan. 18, 1927 |
| 2,324,735 | Spanel | July 30, 1943 |
| 2,382,784 | Emery | Aug. 14, 1945 |
| 2,570,182 | Daly et al. | Oct. 9, 1951 |
| 2,586,275 | Toulmin | Feb. 19, 1952 |
| 2,694,871 | Rollman | Nov. 23, 1954 |
| 2,744,340 | Gerber | May 8, 1956 |